United States Patent
Patel

(10) Patent No.: US 9,938,956 B2
(45) Date of Patent: Apr. 10, 2018

(54) ENERGY HARVESTING SYSTEM FOR OCEAN WAVES

(71) Applicant: Rohan V Patel, Bensalem, PA (US)

(72) Inventor: Rohan V Patel, Bensalem, PA (US)

(73) Assignee: Rohan Patel, Bensalem ( * ) Notice: Subject to any disclaimer, the term of this patent is extended or adjusted under 35 U.S.C. 154(b) by 0 days.

(21) Appl. No.: 14/997,652

(22) Filed: Jan. 18, 2016

(65) Prior Publication Data

US 2016/0131102 A1    May 12, 2016

Related U.S. Application Data

(63) Continuation-in-part of application No. PCT/US2015/019249, filed on Mar. 6, 2015, which is a continuation-in-part of application No. 14/639,879, filed on Mar. 5, 2015, now Pat. No. 9,145,866, and a continuation-in-part of application No. 14/303,569, filed on Jun. 12, 2014, now abandoned, said application No. PCT/US2015/019249 is a continuation-in-part of application No. 14/303,569.

(60) Provisional application No. 61/973,796, filed on Apr. 1, 2014, provisional application No. 61/988,037, filed on May 2, 2014.

(51) Int. Cl.
*F03B 13/18*    (2006.01)

(52) U.S. Cl.
CPC ........ *F03B 13/1885* (2013.01); *F03B 13/189* (2013.01); *F03B 13/1815* (2013.01); *Y02E 10/38* (2013.01)

(58) Field of Classification Search
CPC .... F03B 13/18; F03B 13/1885; F03B 13/189; F03B 13/1815; F03B 13/1845; F03B 13/1855; F03B 13/182; F03B 13/1805; F03B 13/181; F03B 13/16; F03B 13/14; B63B 1/107; B63B 36/06; B63B 2035/446; B63B 35/00; B63B 2035/4466; B63C 1/02; F05B 2240/93; Y02E 10/38; Y02E 10/183
USPC ....................................... 290/42, 53
See application file for complete search history.

(56) References Cited

U.S. PATENT DOCUMENTS

| | | | | |
|---|---|---|---|---|
| 1,790,058 A | * | 1/1931 | Morse ................. | F03B 13/1885 60/504 |
| 4,196,591 A | * | 4/1980 | Wallace .............. | F03B 13/1895 417/332 |
| 5,359,229 A | * | 10/1994 | Youngblood ....... | F03B 13/1855 290/42 |
| 5,578,889 A | * | 11/1996 | Epstein ................... | F03B 13/14 290/53 |
| 7,298,054 B2 | * | 11/2007 | Hirsch ................ | F03B 13/1845 290/42 |

(Continued)

*Primary Examiner* — Viet Nguyen
*Assistant Examiner* — Joseph Ortega

(57) ABSTRACT

Disclosed is an energy harvesting system for ocean waves. The energy harvesting system includes each of a buoyant platform and a plurality of wave energy harvesting units. The buoyant platform is configured to float above the ocean bed. Further, each wave energy harvesting unit may be tethered between the buoyant platform and the ocean bed. Additionally, a wave energy harvesting unit may be configured to be actuated by motion of the buoyant platform. Accordingly, the wave energy harvesting unit may absorb energy from the buoyant platform's movement resulted from the ocean waves.

31 Claims, 14 Drawing Sheets

(56) References Cited

U.S. PATENT DOCUMENTS

| | | | | |
|---|---|---|---|---|
| 7,755,211 B2* | 7/2010 | Montgomery | F03B 13/1865 | 290/42 |
| 8,912,677 B2* | 12/2014 | Dehlsen | E02B 9/08 | 290/53 |
| 9,297,351 B2* | 3/2016 | Siegel | F03B 13/183 | |
| 9,309,860 B2* | 4/2016 | Hon | F03B 13/1815 | |
| 9,334,849 B2* | 5/2016 | Dehlsen | F03B 13/264 | |
| 2005/0099010 A1* | 5/2005 | Hirsch | F03B 13/1845 | 290/42 |
| 2007/0089409 A1* | 4/2007 | Serrano Molina | F03B 13/1885 | 60/504 |
| 2008/0146103 A1* | 6/2008 | Gerber | B63B 22/00 | 441/100 |
| 2008/0169653 A1* | 7/2008 | Olson | F03B 13/1815 | 290/53 |
| 2008/0238102 A1* | 10/2008 | Wegener | F03B 13/16 | 290/53 |
| 2008/0272600 A1* | 11/2008 | Olson | F03B 13/1815 | 290/53 |
| 2009/0015103 A1* | 1/2009 | Rastegar | F03B 13/20 | 310/328 |
| 2009/0235660 A1* | 9/2009 | Oigarden | F03B 13/1845 | 60/501 |
| 2010/0043425 A1* | 2/2010 | Dragic | F03B 13/1855 | 60/504 |
| 2010/0102562 A1* | 4/2010 | Greenspan | F03B 13/1865 | 290/53 |
| 2010/0107627 A1* | 5/2010 | Morgan | B63B 35/44 | 60/495 |
| 2011/0008178 A1* | 1/2011 | Spidell | F03B 13/1845 | 417/53 |
| 2012/0086206 A1* | 4/2012 | Karimi | F03D 9/007 | 290/53 |
| 2012/0090313 A1* | 4/2012 | Myklebust | B63B 21/50 | 60/505 |
| 2012/0208414 A1* | 8/2012 | Hu | B63B 35/44 | 441/21 |
| 2012/0247096 A1* | 10/2012 | Gerber | F03B 13/1855 | 60/496 |
| 2012/0285544 A1* | 11/2012 | Westby | F03B 13/1885 | 137/1 |
| 2012/0306210 A1* | 12/2012 | Wen | F03B 13/1885 | 290/53 |
| 2013/0002056 A1* | 1/2013 | Nair | F03B 13/1885 | 310/26 |
| 2013/0008157 A1* | 1/2013 | Zuo | F03B 13/18 | 60/497 |
| 2013/0008158 A1* | 1/2013 | Hon | F03B 13/186 | 60/506 |
| 2013/0269333 A1* | 10/2013 | Williams | F03B 13/1885 | 60/506 |
| 2015/0210362 A1* | 7/2015 | Ruiz Diez | B63B 35/44 | 114/61.1 |
| 2016/0061180 A1* | 3/2016 | Eavis | F03B 13/182 | 290/53 |

* cited by examiner

ENERGY HARVESTING SYSTEM FOR OCEAN WAVES

RELATED APPLICATIONS

The current application is a continuation in part of PCT Patent Application PCT/US15/19249 filed Mar. 6, 2015 which claims benefit of U.S. patent application Ser. No. 14/639,879 filed Mar. 5, 2015 which claims benefit of U.S. Provisional Patent Application 61/988,037 filed May 2, 2014.

U.S. patent application Ser. No. 14/639,879 filed Mar. 5, 2015 is a continuation in part of U.S. patent application Ser. No. 14/303,569 filed Jun. 12, 2014 which claims benefit of U.S. Provisional Patent Application 61/973,796 filed Apr. 1, 2014.

PCT/US15/19249 filed Mar. 6, 2015 claims benefit of U.S. patent application Ser. No. 14/303,569 filed Jun. 12, 2014 which claims benefit of U.S. Provisional Patent Application 61/973,796 filed Apr. 1, 2014.

PCT/US15/19249 filed Mar. 6, 2015 claims benefit of U.S. Provisional Patent 61/973,796 filed Apr. 1, 2014.

PCT/US15/19249 filed Mar. 6, 2015 claims benefit of U.S. Provisional Patent Application 61/988,037 filed May 2, 2014.

FIELD OF THE INVENTION

The present invention relates generally to renewable energy and green energy systems. More specifically, the present invention is a renewable energy system based on ocean surface waves.

BACKGROUND OF THE INVENTION

Renewable energy systems involve the use of resources that are continuously replenished such as sunlight, wind, rain, oceanic tides and waves, and geothermal heat. Renewable energy systems are favorable due to their ability to provide sustainable energy with largely reduced impact on the environment. The reduced environmental impact of renewable energy systems is particularly favorable relative to electricity generation from burning fossil fuel sources such as petroleum, coal, and natural gas. Fossil fuels yield a significantly high amount of energy relative to units burned. However, this benefit comes at the cost of increased greenhouse gas emissions into the atmosphere from the combustion of fossil fuels. Additionally, because fossil fuels generally form over millions of years, they are considered a non-renewable source of energy. Perhaps the most prominent consequence of greenhouse gas emissions is the progressive increase in the temperature of the Earth's atmosphere and oceans. Increased greenhouse gas emissions along with factors such as deforestation have led to warming of the Earth's climate system. The problem is projected to worsen in the future as the Earth's population increases, leading to a corresponding increase in energy demand and consumption. The consequences of the Earth's increasing temperature are perhaps most visible in the gradual decline of the Arctic sea ice over the years. The melting of the polar icecap has resulted in a rising of the sea level as well. Numerous ecosystems of the Earth negatively affected by rising temperatures and increased atmospheric CO2 concentrations. Renewable energy systems greatly reduce the impact on the Earth's environment. However, despite technological advancements in renewable energy systems in recent years, renewable energy systems remain underutilized. Renewable energy systems hold a relatively low percentage share relative to conventional (fossil fuel) energy systems.

Therefore, an objective of the present invention is to provide a renewable energy system based on ocean surface waves, which are a readily available energy source. Another objective of the present invention is to provide a renewable energy system without having a negative environmental impact.

SUMMARY

Disclosed is an energy harvesting system for ocean waves according to some embodiments. The energy harvesting system includes each of a buoyant platform and a plurality of wave energy harvesting units. The buoyant platform is configured to float above the ocean bed. Further, each wave energy harvesting unit may be tethered between the buoyant platform and the ocean bed. Additionally, a wave energy harvesting unit may be configured to be actuated by motion of the buoyant platform. Accordingly, the wave energy harvesting unit may absorb energy from the buoyant platform's movement resulted from the ocean waves.

Also disclosed is a system for converting energy in waves of a fluid into rotatory movement according to some embodiments. The system may include a buoyant platform configured to float in the fluid. Further, the system may include at least one pair of levers pivotally mounted on the buoyant platform at fixed ends of the at least one pair of levers. Furthermore, the free ends of the at least one pair of levers may be tethered to a stationary body by means of a plurality of cables. Additionally, the system may include at least one shaft rotatably mounted on the buoyant platform. Further, the system may include at least one pair of springs attached between the at least one pair of levers and the buoyant platform. Furthermore, a spring attached between a lever of the at least one pair of levers and the buoyant platform may be configured to maintain the lever in an equilibrium position. Additionally, the system may include a gear mechanism coupled to each of the at least one pair of levers and the at least one shaft. Further, the gear mechanism may be configured to convert pivotal movement of the at least one pair of levers into a rotatory movement of the at least one shaft.

DETAILED DESCRIPTION OF THE INVENTION

All illustrations of the drawings are for the purpose of describing selected versions of the present invention and are not intended to limit the scope of the present invention.
Overview:

Disclosed is an energy harvesting system for ocean waves according to some embodiments. The energy harvesting system may include each of a buoyant platform and a plurality of wave energy harvesting units. The buoyant platform may be configured to float above the ocean bed. In some embodiments, the buoyant structure may be a marine buoy. Further, each wave energy harvesting unit may be tethered between the buoyant platform and the ocean bed. Additionally, a wave energy harvesting unit may be configured to be actuated by motion of the buoyant platform. Accordingly, the wave energy harvesting unit may absorb energy from the buoyant platform's movement resulted from the ocean waves.

Figure 1:
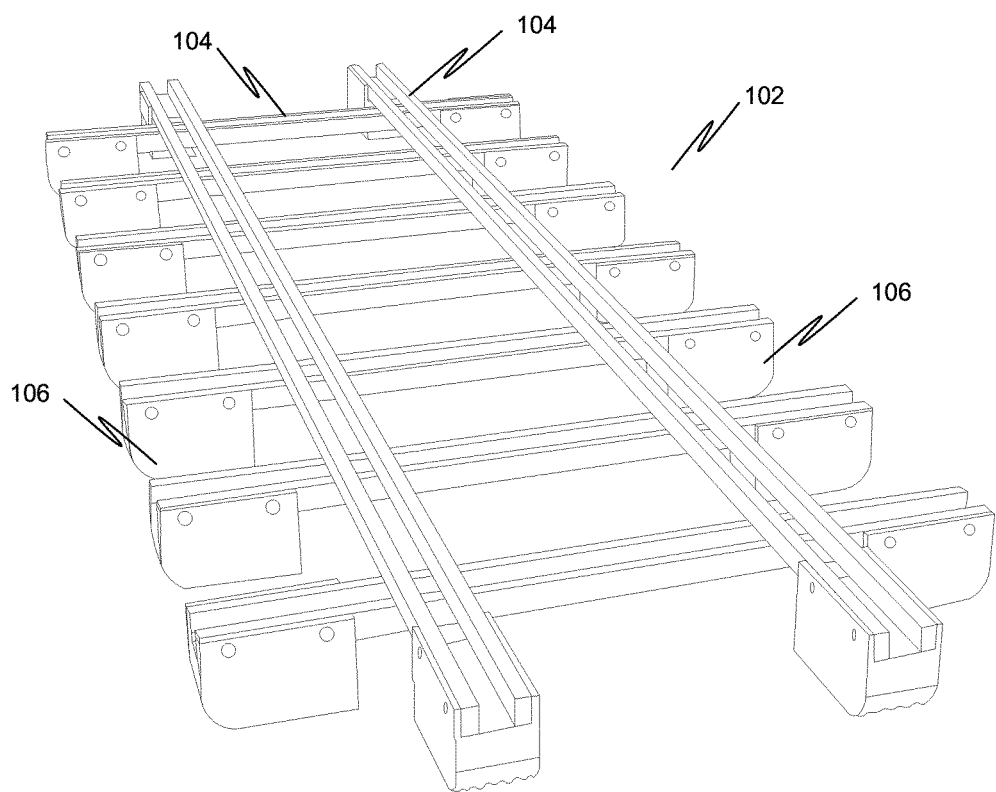
FIG. 1 is a perspective view of a buoyant platform of an energy harvesting system for ocean waves in accordance with various embodiments.

In some embodiments, the buoyant platform may include one or more rail and one or more buoyant structure, as exemplarily illustrated in FIG. 1. Further, the rail may be attached to the one or more buoyant structure. Further, the buoyant structure helps keep the buoyant platform afloat above from ocean bed. Additionally, in some embodiments, the buoyant platform may include a plurality of rails of different shapes and a plurality of buoyant structures. Further, the plurality of rails is spaced apart from one another to form the buoyant platform with spaces between the plurality of rails.

In some embodiments, the buoyant structure may keep the buoyant platform above the ocean bed. Further, in some other embodiments, the buoyant platform may be configured to float above the ocean bed and above the water surface, as exemplarily illustrated in FIG. 7. Additionally, in some embodiments, the buoyant platform may be configured to float above the ocean bed but below the water surface, as exemplarily illustrated in FIG. 10. Further, the buoyant platform may be configured to move around due to waves. Furthermore, in some embodiments, the buoyant platform may be placed free floating above the ocean bed. Accordingly, a force applied to the buoyant platform by the waves may be leveraged against the ocean bed in order to harvest energy.

Figure 2:
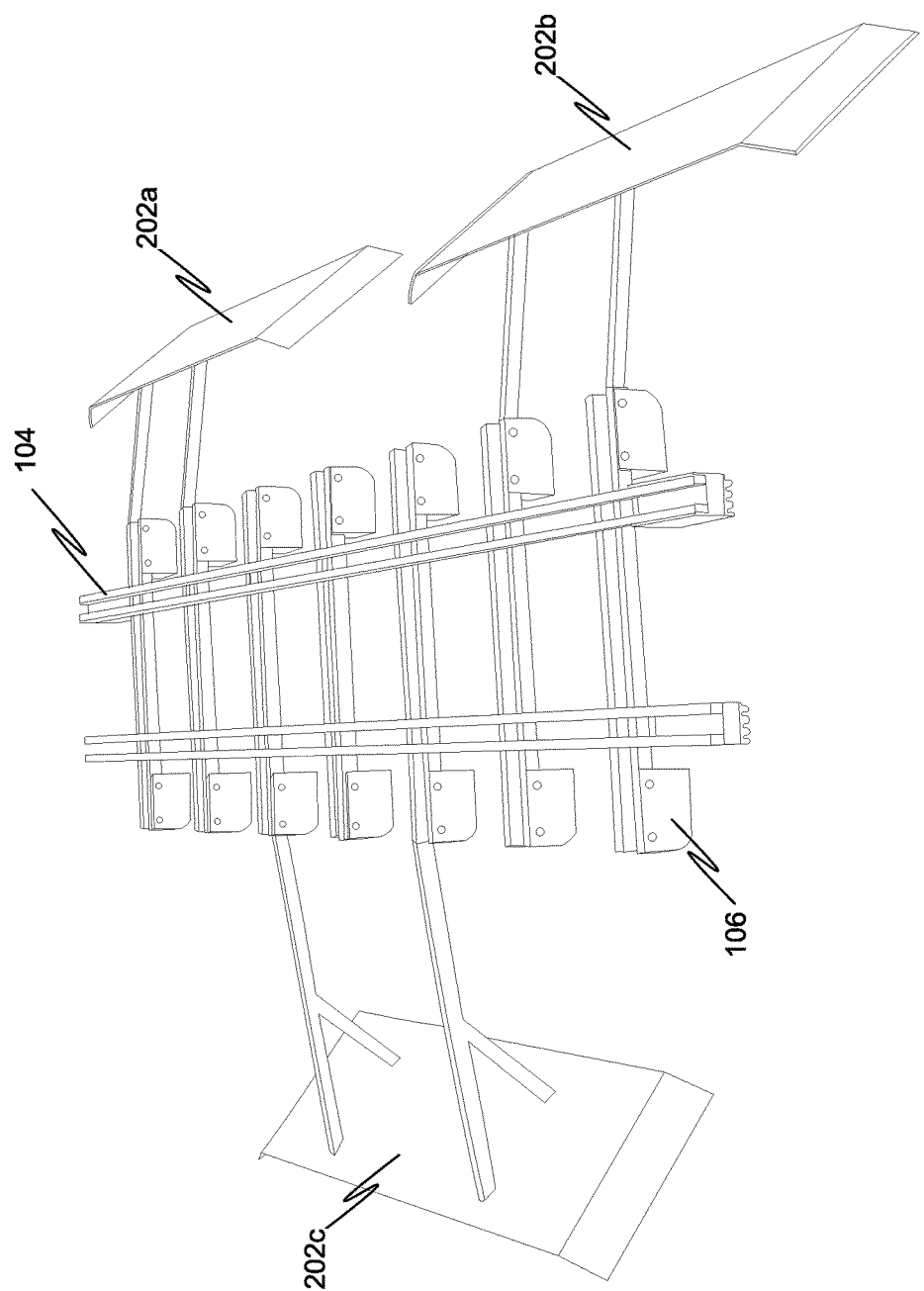
FIG. 2 is a perspective view of a buoyant platform including wave-catchers for harvesting energy from ocean waves according to various embodiments.

In some embodiments, the buoyant platform may further include one or more wave-catchers as exemplarily illustrated in FIG. 2. Furthermore, the one or more wave-catchers may be connected to the buoyant platform. Additionally, the one or more wave-catchers may be configured to move the buoyant platform further in a direction of a wave by restricting moving waves. Moreover, the one or more wave-catchers may push the buoyant platform and transfer all energy harvested by the wave-catcher from intercepting waves. Further, in some embodiments, each of one or more first wave-catcher and one or more second wave-catcher may be configured to intercept travelling waves. Furthermore, in some embodiments, each of the one or more wave-catchers may be configured to intercept travelling waves.

Figure 7:
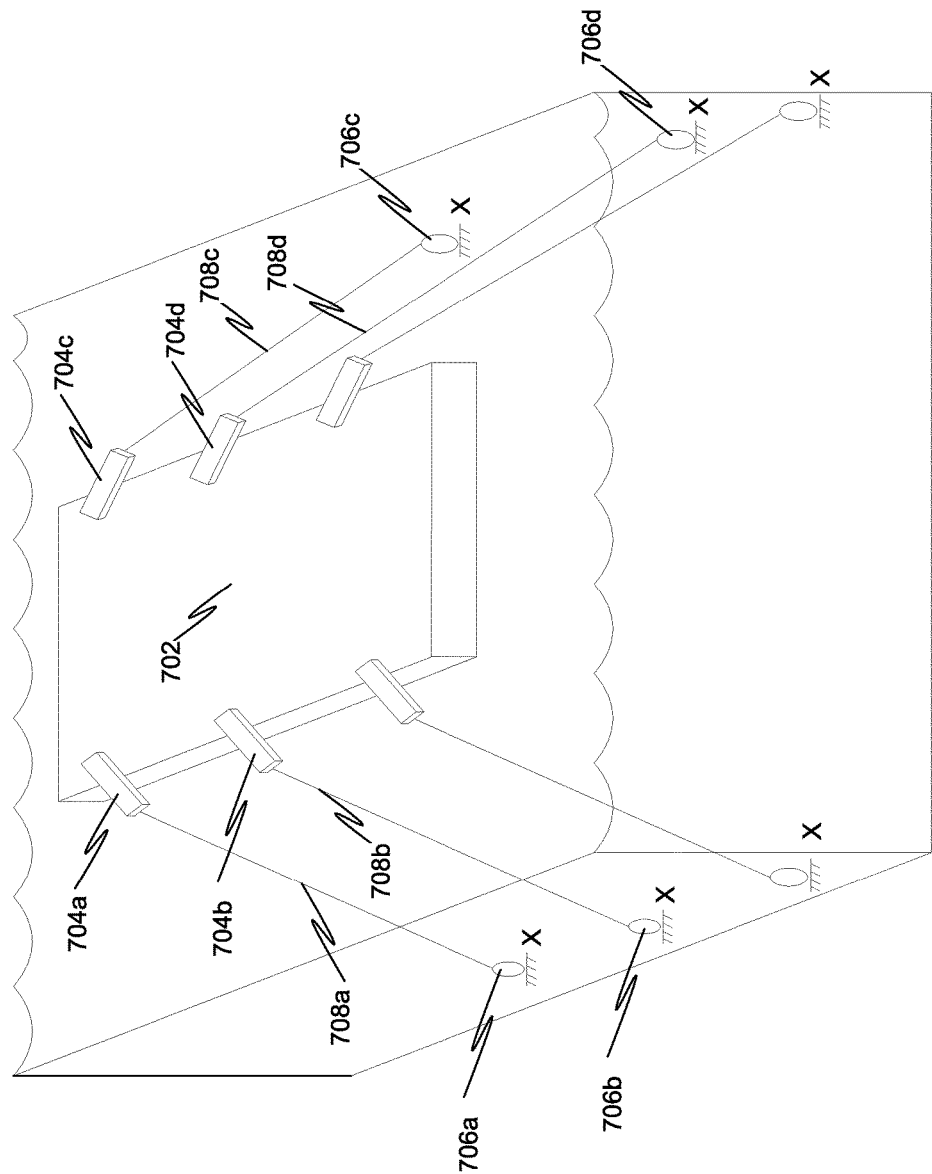
FIG. 7 to FIG. 10 illustrate a perspective view of a buoyant platform of an energy harvesting system for ocean waves in accordance with various embodiments.

In some embodiments, the wave energy harvesting unit may be mounted on the buoyant platform, as exemplarily illustrated in FIG. 7. Further, the wave energy harvesting unit may be tethered to the ocean bed. In some embodiments, the wave energy harvesting unit may be tethered between the buoyant platform and the ocean bed, as exemplarily illustrated in FIG. 8. In some embodiments, the wave energy harvesting unit may be secured at the ocean bed, as exemplarily illustrated in FIG. 9. Further, the buoyant platform may be tethered to the wave energy harvesting unit at the ocean bed. Accordingly, in various embodiments, the wave energy harvesting unit may be actuated by motion of the buoyant platform.

Figure 11:
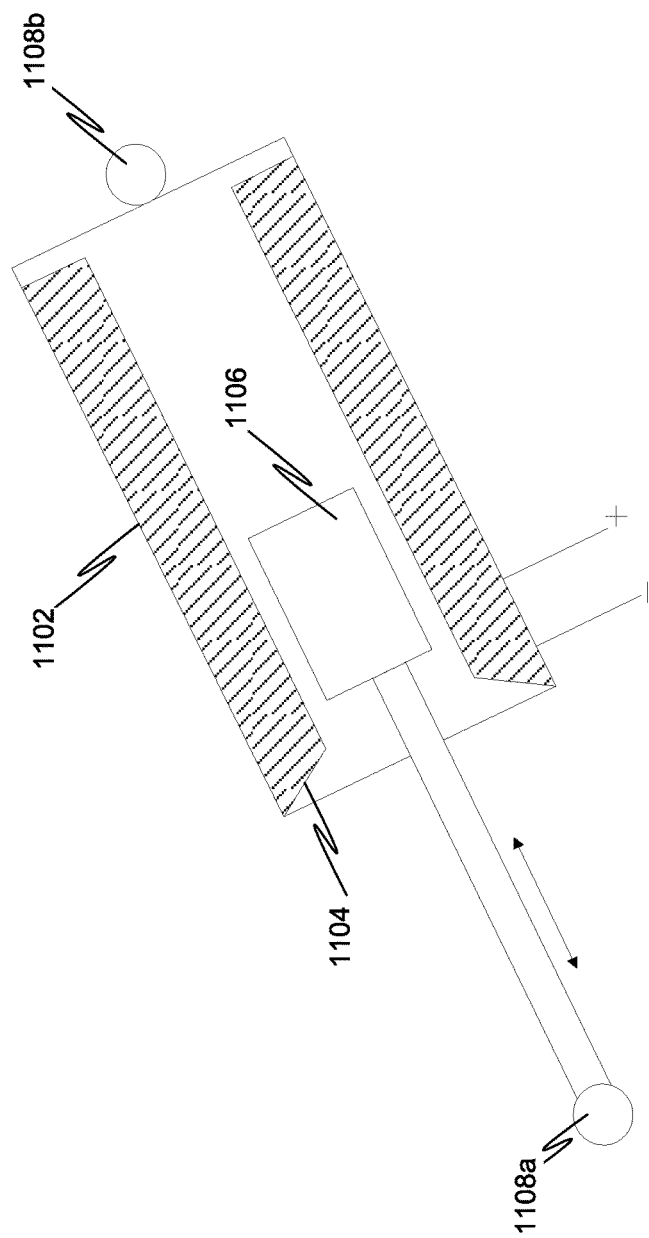
FIG. 11 illustrates a cross-sectional view of a linear generator included in the energy harvesting system for ocean waves in accordance with various embodiments.

In some embodiments, the wave energy harvesting unit may be a linear generator, as exemplarily illustrated in FIG. 11. Further, the linear generator may be configured to generate electricity from movement of the buoyant platform. In some embodiments, the wave energy harvesting unit may be a hydraulic cylinder, as exemplarily illustrated in FIG. 12. Further, the hydraulic cylinder may harvest energy by pressurizing fluid from movement of the buoyant platform.

Figure 6A:
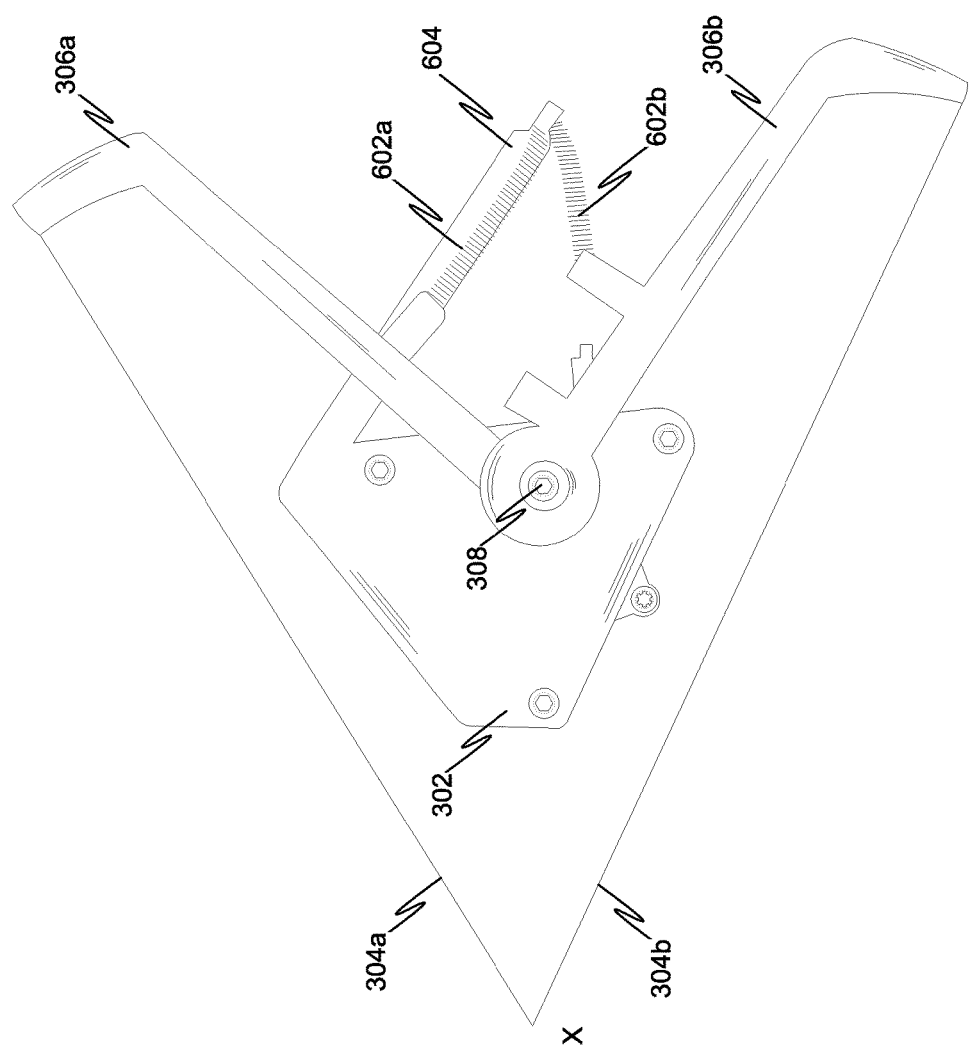
FIG. 6A to 6C are schematic side views of the wave energy harvesting system for ocean waves according to an exemplary embodiment at various stages during, for example, interception of a surface water wave.
Figure 6B:
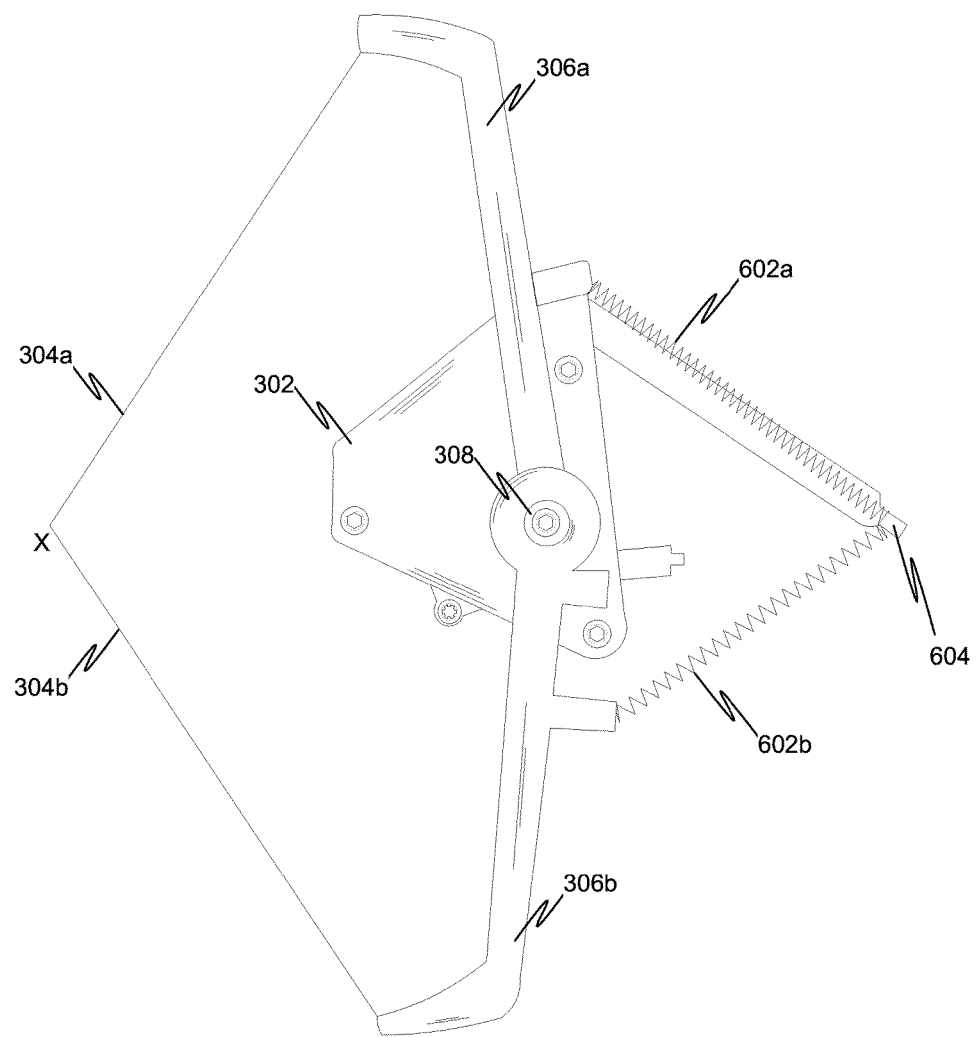
Figure 6C:
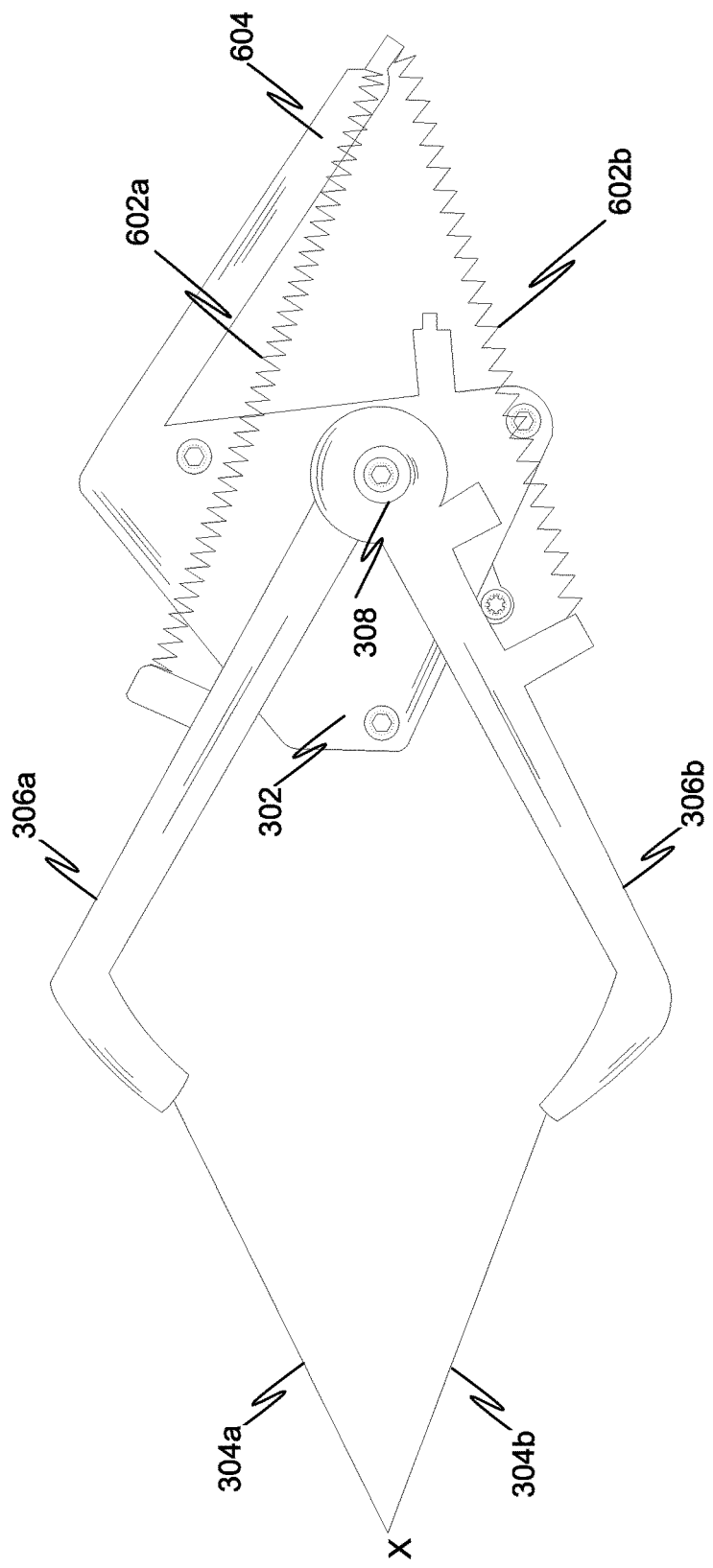

In some embodiments, the wave energy harvesting unit may include two levers mounted on same shaft, as exemplarily illustrated in FIG. 6A-6C. Further, a first lever of the two levers may be operationally connected to an input shaft with a one-way locking mechanism in-between. Additionally, a second lever of the two levers may be operationally connected to an input shaft with a one-way locking mechanism in-between. The one-way locking mechanism may be a one-way bearing operationally connected between the two levers and an input shaft. Further, the wave energy harvesting unit may include a return spring for the second lever. In some embodiments, the return spring may be a torsion bar. Furthermore, the first lever may be configured to spin the input shaft while the first lever may be being actuated and the second lever may be configured to spin the input shaft while the second lever may be being released.

Further, in accordance with an exemplary embodiment, a system for converting energy from waves into another form such as, for example, electricity is disclosed. The system includes a buoyant platform capable of floating on the surface of a water body such as, for example, an ocean. The buoyant platform may be constructed from any suitable combination of materials that can endure a water environment for long periods of time while also being buoyant. For example, the buoyant platform may be made from light weight materials with sufficient strength such as aluminum. Further, to provide greater buoyancy, air or gas filled bladders may also be used to construct the buoyant platform. An exemplary buoyant platform is illustrated in FIG. 1.

In addition, the system may include one or more wave catchers attached to the buoyant platform. In general, the wave catcher may be of such a form that the wave catcher can intercept a surface water wave. Preferably, the wave catcher may be of a form such that a sufficiently large area of the wave catcher may be presented against a surface water wave.

For instance, the wave catcher may include a large rectangular sheet as exemplarily illustrated as 202a to 202c in FIG. 2. Further, the rectangular sheet may be oriented in such a way that the plane of the rectangular sheet may be substantially perpendicular to the direction of travel of a surface wave.

Furthermore, the rectangular sheet may be angled in relation to the surface of the water body such as the ocean. The angle may be such that the rectangular may intercept a surface wave at point on the wave having a large kinetic energy. For instance, a face of the rectangular sheet configured to come in contact with the surface wave may form an angle between 90 and 180 degrees with the surface of the water body. As a result, the face of the rectangular sheet may intercept an incoming surface wave when the wave has attained substantially maximum kinetic energy. Accordingly, there may be substantially maximum transfer of energy from the surface water wave onto the buoyant platform. Consequently, the buoyant platform may move due to interception of the surface water wave by the wave catcher. For instance, the buoyant platform may move in a substantially linear motion when a surface wave is intercepted by the wave catcher.

Further, in order to convert the motion of the buoyant platform resulted from intercepting surface water waves, the system may include a wave energy harvesting unit, exemplarily illustrated as 302a to 302d. In general, the wave energy harvesting unit may be any mechanism configured to convert the movements of the buoyant platform into a useful form of energy. For example, the wave energy harvesting unit may include an electrical generator, such as 310a to 310d, configured to convert the mechanical motion of the buoyant platform into electrical energy.

In order to harvest energy from the movements of the buoyant platform, a stationary body that is substantially stationary in presence of surface water waves may be used. For instance, the stationary body may be the water bed, such as the ocean bed. In another instance, the stationary body may be a large buoyant structure submerged in the water body while staying stationary in the presence of surface water waves. In yet another instance, the stationary body may be a sea shore.

Further, a part of the wave energy harvesting unit may be connected to the stationary body. For example, the stationary body in some embodiments may include the ocean bed. Accordingly, the wave energy harvesting unit may be tethered to the ocean bed using cables, exemplarily illustrated as 304a and 304b in FIG. 3. For instance, a steel cable may be tethered to the ocean bed at one end while a second end of the steel cable may be tethered to the wave energy harvesting unit. For example, the second end of the steel cable may be tethered to a spring loaded part of the wave energy harvesting unit. As a result, when the buoyant platform moves due to interception of waves, there may be a resultant pulling force exerted along the steel cable. Consequently, the spring loaded part may be pulled and energy may be stored in the spring included in the wave energy harvesting unit. Subsequently, when the surface water wave has subsided, the spring may return to its equilibrium state. As a result, motion of the buoyant platform may be converted into to and fro motion of the spring loaded part of the wave energy harvesting unit. By coupling the spring loaded part to a rotor of an electric generator, the motion of the spring loaded part may be converted to electrical energy.

In an instance, the spring loaded part may be connected to a rack and pinion mechanism to convert the linear motion of the spring loaded part to circular motion of a shaft. Further, the pinion may be coupled to the shaft through a one way bearing. As a result, the shaft would rotate in the same direction during both to and fro motion of the spring loaded part. Further, the shaft may drive an electric generator in order to produce electricity.

In another instance, the spring loaded part may include a pair of levers, such as 306a and 306b, pivotally coupled at respective first ends of the arms onto a common shaft, such as 308. Further, a second end of each lever may be tethered to the stationary body such as the ocean bed through a pair of connecting elements such as steel cables. The two levers may be configured to be pivotally movable.

Further, a pair of springs may be used to maintain the pair of levers in an equilibrium position as shown in FIG. 6A. For example, the equilibrium position may correspond to each of the pair of levers held back by the respective spring 602a and 602b such that a distance between the second end of each lever and the stationary body is maximum. As a result, when the buoyant platform moves due to impinging surface water waves, there may be a pulling force acting on the connecting elements such as steel cables. Consequently, the pair of levers may pivotally move with the second end of each lever executing a large angular displacement as illustrated in FIGS. 6B and 6C. Accordingly, the common shaft may be imparted with a rotational motion.

By coupling the common shaft to a rotor of an electric generator through a one-way bearing mechanism, the rotation of the common shaft may be converted into electrical energy. Further, as the surface water wave subsides, the buoyant platform may move in an opposite direction and the pulling force in the connecting elements may diminish. As a result, the pair of levers may pivotally move returning to the equilibrium position. Further, the use of the one-way bearing mechanism may cause the rotational motion of the common shaft in both directions to be transferred to the rotor in the same rotational direction. In other words, independent of the direction in which the pair of levers move pivotally, the rotor of the electric generator may continue to move in the same rotational direction. The electricity generated may be directly used to power an electric load in one instance. Alternatively, in another instance, the electricity generated may be stored in an energy storage device such as, but not limited, to a battery.

Turning now to FIG. 1, an energy harvesting system 100 for ocean waves according to some embodiments is illustrated. The energy harvesting system 100 may include a buoyant platform 102. The buoyant platform 102 may be configured to float above the ocean bed. In some embodiments, the buoyant platform 102 may be configured to float above the ocean bed and above the water surface. In some other embodiments, the buoyant platform 102 may be configured to float above the ocean bed but below the water surface. Further, the buoyant platform 102 may be configured to move around due to waves. For example, the buoyant structure may be a marine buoy.

Further, in some embodiments, the buoyant platform 102 may include each of one or more rails 104 and one or more buoyant structures 106. Furthermore, the one or more rails 104 may be attached to the one or more buoyant structures 106. Additionally, the buoyant structure 102 may help keep the buoyant platform 102 afloat above from ocean bed.

Furthermore, in some embodiments, the buoyant platform 102 may include a plurality of rails 104 of different shapes and a plurality of buoyant structures. Further, the plurality of rails 104 may be spaced apart from one another to form the buoyant platform 102 with spaces between the plurality of rails 104 as illustrated in FIG. 1.

In some embodiments, the buoyant platform 102 may include a buoyant structure configured to keep said buoyant platform 102 above the ocean bed. For instance, in some embodiments, the buoyant structure may include inflatable bladders made of heavy duty and flexible air or gas retaining material such as a heavy duty polymeric/rubberized or composite composition. Further, the inflatable bladders may be expanded by a pressurized gas charge and may be sufficiently puncture resistant to maintain inflation in a dynamic environment.

Additionally, in some embodiments, the buoyant platform 102 may further include one or more wave-catchers 202, exemplarily illustrated as wave-catcher 202a, 202b and 202c in FIG. 2. Further, the one or more wave-catchers 202 may be connected to the buoyant platform 102. Furthermore, the one or more wave-catchers 202 may be configured to move the buoyant platform 102 further in a direction of a wave by restricting moving waves. Additionally, the one or more wave-catchers 202 may push the buoyant platform 102 and transfer all energy harvested by the one or more wave-catchers 202 from intercepting waves. Accordingly, each of the one or more wave-catchers 202 may be configured to intercept travelling waves. For instance, each of one or more first wave-catchers 202a and one or more second wave-catchers 202b may be configured to intercept travelling waves.

Figure 3:
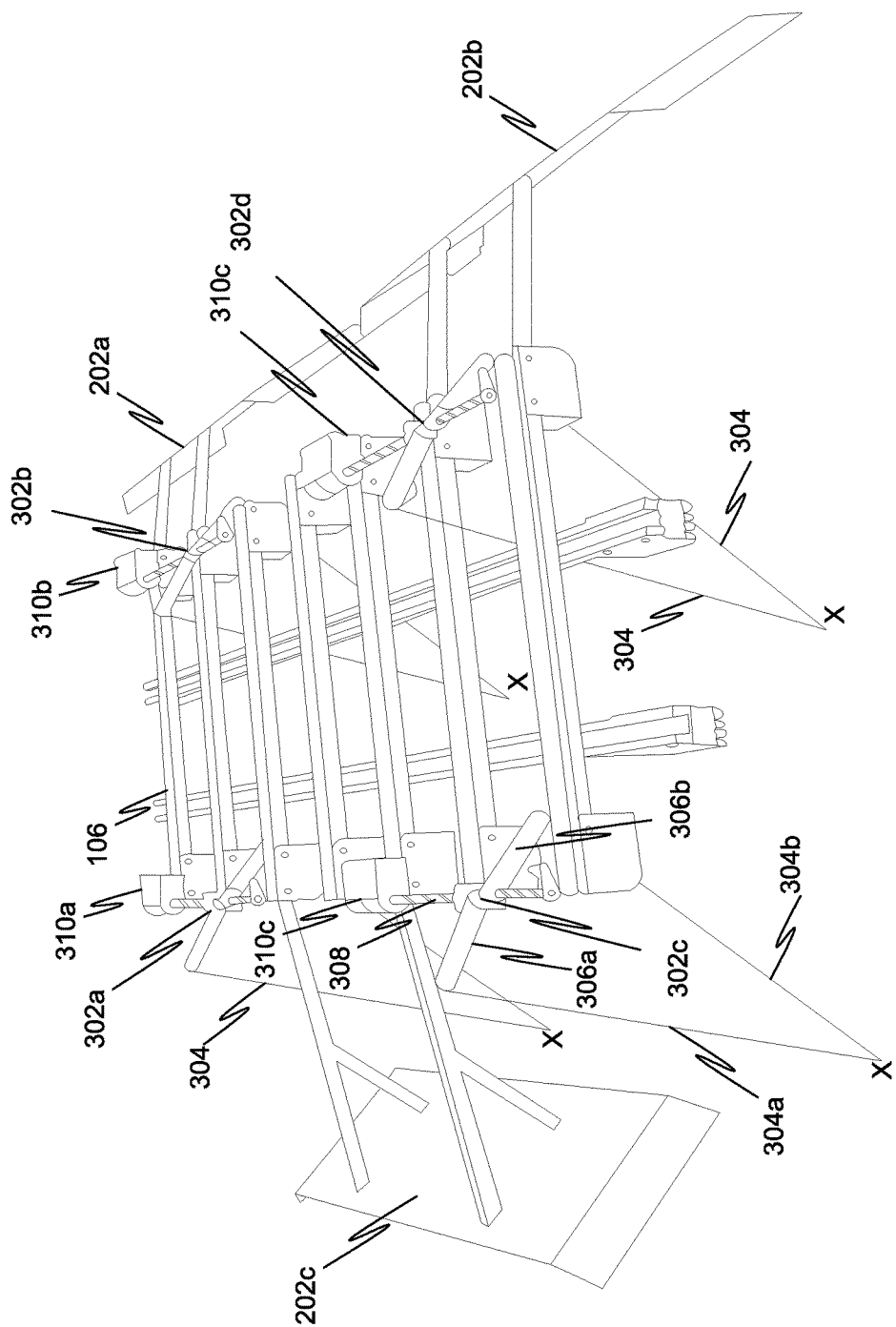
FIG. 3 is a perspective view of an energy harvesting system for ocean waves in accordance with various embodiments.
Figure 4:
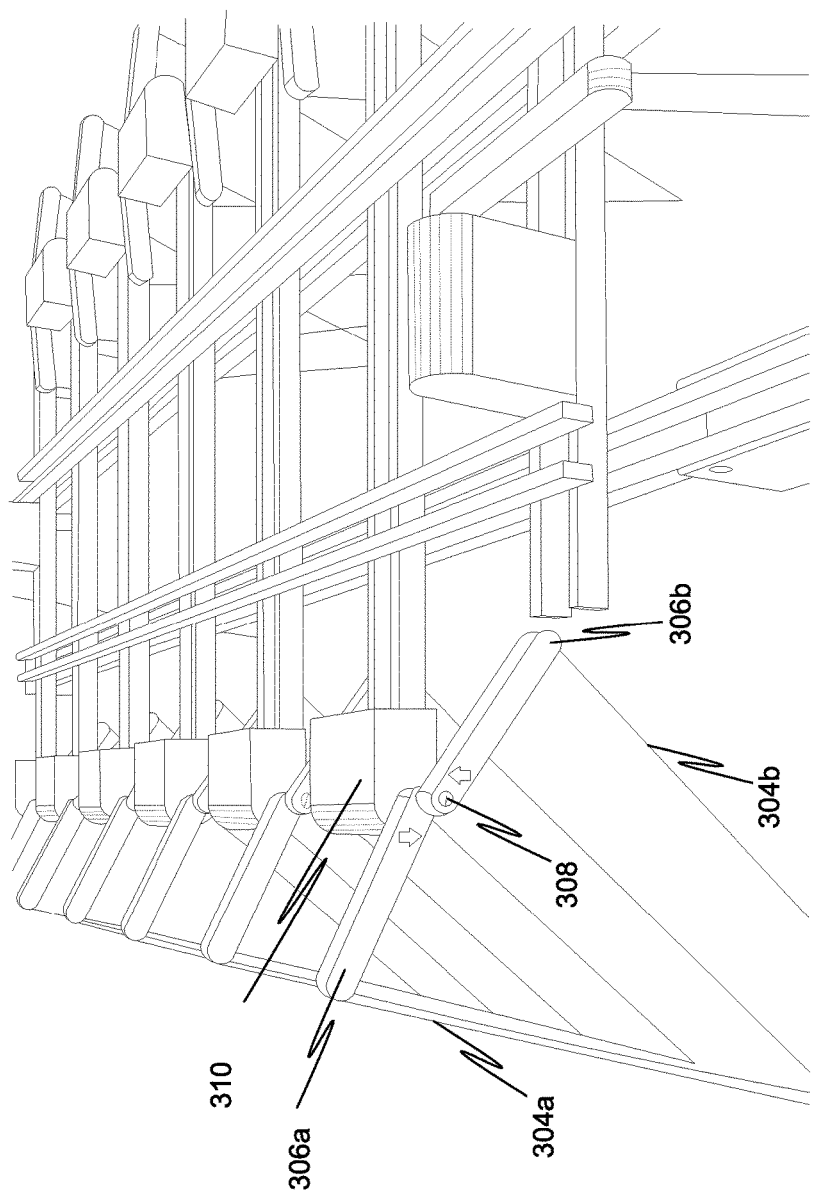
FIG. 4 is a close-up view of an energy harvesting system for ocean waves in accordance with various embodiments.

Further, the energy harvesting system 100 may include a plurality of wave energy harvesting units 302, exemplarily illustrated as 302a, 302b, 302c, and 302d in FIG. 3. Further, two or more of the plurality of wave energy harvesting units 302 may be tethered between the buoyant platform 102 and the ocean bed, illustrated as point 'X'. For instance, each of the plurality of wave energy harvesting units 302 may be tethered to the ocean bed using cables 304. For example, the wave energy harvesting unit 302c may be tethered to the ocean bed using cable 304a and 304b as illustrated.

Additionally, a wave energy harvesting unit 302 may be actuated by motion of the buoyant platform 102. Accordingly, the wave energy harvesting unit 302 may absorb energy from the movement of the buoyant platform 102 resulted from the ocean waves. Further, the wave energy harvesting unit 302 may harvest kinetic energy absorbed from waves and convert into another form of energy.

Further, in some embodiments, the wave energy harvesting unit 302 may be mounted on said buoyant platform 102 as exemplarily illustrated in FIG. 3. Furthermore, the wave energy harvesting unit 302 may be tethered to the ocean bed. As a result, the wave energy harvesting unit may be actuated by motion of the buoyant platform 102 against the ocean bed in order to harvest energy. In some embodiments, the wave energy harvesting unit 302 may be tethered between the buoyant platform 102 and the ocean bed. As a result, the wave energy harvesting unit 302 may be actuated by motion of the buoyant platform 102. Further, in some embodiments, the wave energy harvesting unit 302 may be secured at the ocean bed. Additionally, the buoyant platform 102 may be tethered to the wave energy harvesting unit 302 at the ocean bed. Accordingly, the wave energy harvesting unit 302 may be actuated by motion of the buoyant platform 102.

In some embodiments, the wave energy harvesting unit 302 may be a linear generator configured to generate electricity from movement of the buoyant platform 102. In some other embodiments, the wave energy harvesting unit 302 may be a hydraulic cylinder configured to harvest energy by pressurizes fluid from movement of the buoyant platform 102.

In some embodiments, the wave energy harvesting unit 302 may include two levers 306, exemplarily illustrated as lever 306a and lever 306b in FIG. 3. Further, the two levers 306 may be mounted on same shaft such as shaft 308 as illustrated. Additionally, a first lever 306a of the two levers 306 may be operationally connected to an input shaft 308 with a one-way locking mechanism in-between. In some embodiments, the one-way locking mechanism may be a one-way bearing operationally connected between the two levers 306 and the input shaft 308. Similarly, a second lever 306b of the two levers 306 may be operationally connected to the input shaft 308 with a one-way locking mechanism in-between.

Further, the first lever 306a may be configured to spin the input shaft 308 while the first lever 306a is being actuated and the second lever 306b may be configured to spin the input shaft 308 while the second lever 306b is being released. Furthermore, the wave energy harvesting unit 302 may further include a return spring for said second lever 306b. For instance, the return spring may be a torsion bar.

Additionally, the system may include one or more electrical generators 310, such as 310a-310d, rotatably coupled to the input shaft 308. Further, in some embodiments, a rotor of an electrical generator may be rotatably coupled to the input shaft 308. Accordingly, kinetic energy from surface water waves may be converted into rotational energy of the input shaft 308 and consequently into electrical energy.

Further, according to some other embodiments, a system 500 for converting energy in waves of a fluid into rotatory movement is disclosed. The fluid may be, for example, water which may be contained in a water body such as a river, sea or ocean.

The system may include a buoyant platform 502 configured to float in the fluid. Accordingly, the buoyant platform may be made of a material that can provide sufficient buoyancy. For instance, the buoyant platform may be constructed out of inflatable bladders. Further, in some embodiments, the buoyant platform may include a plurality of rails. Further, a buoyant body may be attached to each end of each rail of the plurality of rails 504.

Furthermore, in some embodiments, the buoyant platform may include each of a plurality of vertical rails 504b and a plurality of horizontal rails 504a. Additionally, each of the plurality of vertical rails 504b and the plurality of horizontal rails 504a may be spaced apart equally. Further, one or more vertical rails of the plurality of vertical rails 504b may be attached to one or more horizontal rails of the plurality of horizontal rails 504a.

Figure 5:
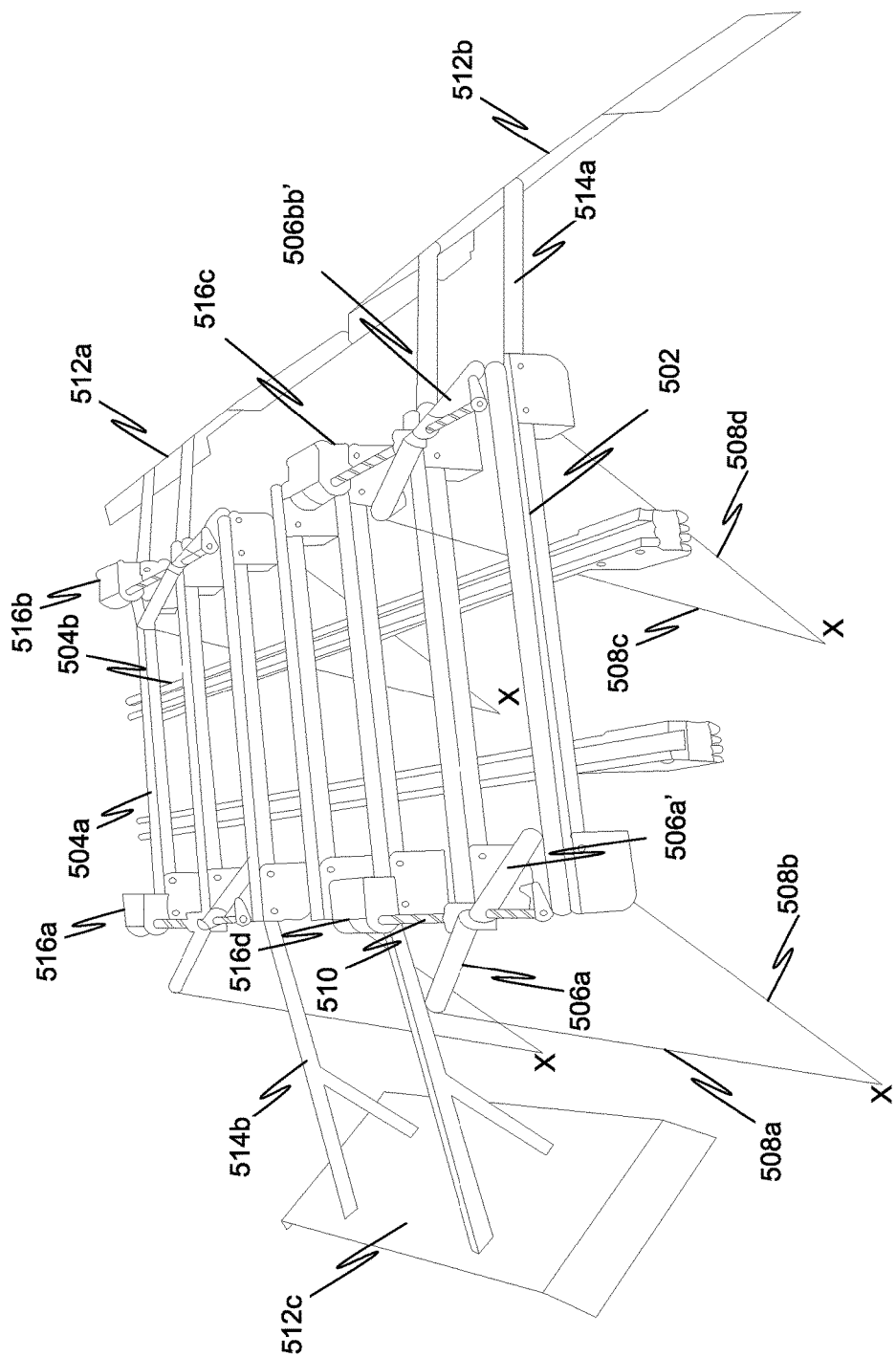
FIG. 5 is a perspective view of a system for converting energy in waves of a fluid into rotatory movement according to some embodiments.

Additionally, the system 500 may include at least one pair of levers 506, illustrated as 506a and 506a', pivotally mounted on the buoyant platform 502 at fixed ends of the at least one pair of levers. In some embodiments, the at least one pair of levers 506 may include a plurality of pairs of levers, such as 506aa' and 506bb', as exemplarily illustrated in FIG. 5. Further, a first plurality of pairs of levers 506, such as 506aa', may be disposed along a first boundary of the buoyant platform 502. Similarly, a second plurality of pairs of levers 506, such as 506bb', may be disposed along a second boundary of the buoyant platform 502. Further, the first boundary may be substantially parallel to the second boundary.

Further, the free ends of the at least one pair of levers 506 may be tethered to a stationary body, such as an ocean bed (shown as X), by means of a plurality of cables 508. In some embodiments, the stationary body may be substantially stationary in the presence of waves in the fluid. Further, in some embodiments, the buoyant platform 502 may be configured to be displaced vertically in relation to the stationary body in the presence of waves in the fluid. In yet other embodiments, the buoyant platform 502 may be configured to be displaced horizontally or any other direction in relation to the stationary body in the presence of waves in the fluid.

Accordingly, in some embodiments, a first free end of a first lever, such as 506a, of a pair of levers of the at least one pair of levers 506 may be tethered to the stationary body, such as the ocean bed, by means of a first cable, such as 508a. Similarly, a second free end of a second lever, such as 506a', of the pair of levers may be tethered to the stationary body, such as the ocean bed, by means of a second cable 508b. Additionally, each of the first cable 508a and the second cable 508b may be attached to a substantially common point of the stationary body, such as point X.

Further, the system 500 may include at least one shaft rotatably mounted on the buoyant platform. Additionally, the system 500 may include at least one pair of springs (now shown in figure) attached between the at least one pair of levers 506 and the buoyant platform 502. Further, a spring attached between a lever of the at least one pair of levers 506 and the buoyant platform 502 may be configured to maintain the lever in an equilibrium position. In some embodiments, the equilibrium position may be a predetermined orientation of the lever in relation to the buoyant platform 502 in the absence of substantial waves in the fluid.

In some embodiments, the system 500 may further include at least one wave catcher 512, exemplarily illustrated as 512a-512c, attached to the buoyant platform 502. Further, the at least one wave catcher 512 may be configured to intercept a wave in the fluid. Furthermore, intercepting the wave may cause at least one of a horizontal displacement and a vertical displacement of the buoyant platform in relation to the stationary body. However, in other embodiments, the at least one wave-catcher 512 may be so configured as to cause a displacement of the buoyant platform 502 in any direction upon interception of a surface water wave.

In some embodiments, the at least one wave catcher 512 may be attached to at least one of a vertical rail of the plurality of vertical rails 504b and a horizontal rail of the plurality of horizontal rails 504a by means of at least one extension 514, such as 514a-b. Further, a longer side of the at least one wave catcher 512 may be substantially perpendicular to the plurality of horizontal rails 504a.

In some embodiments, the at least one wave catcher 512 may be a rectangular sheet. Further, a longer side of the rectangular sheet may be substantially parallel to the plurality of vertical rails 504b. Additionally, the rectangular sheet may be beveled along each of the shorter sides of the rectangular sheet. Furthermore, an orientation of the rectangular sheet in relation to the buoyant platform may be configured to produce maximum displacement of the buoyant platform in relation to the stationary body.

In some embodiments, the at least one wave catcher 512 may include at least one first wave catcher 512, such as 512a and 512b, disposed on a first side of the plurality of vertical rails 504b and at least one second wave catcher 512, such as 512c, disposed on a second side of the plurality of vertical rails 504b. Further, in some embodiments, each of the at least one first wave catcher 512 and the at least one second wave catcher 512 may be configured to intercept waves travelling in a direction substantially perpendicular to the plurality of vertical rails. Furthermore, in some embodiments, the at least one first wave catcher 512 may be configured to intercept waves traveling in a first direction substantially perpendicular to the plurality of vertical rails 504b. Additionally, the at least one second wave catcher 512 may be configured to intercept waves travelling in a second direction substantially perpendicular to the plurality of vertical rails 504b. Further, the first direction may be opposite to the second direction.

Furthermore, the system 500 may include a gear mechanism (not shown in figure) coupled to each of the at least one pair of levers 506 and the at least one shaft 510. Further, the gear mechanism may be configured to convert pivotal movement of the at least one pair of levers 506 into a rotatory movement of the at least one shaft 510.

In some embodiments, the gear mechanism may be configured to convert each of a clockwise pivotal movement of a lever of a pair of levers of the at least one pair of levers 506 and anti-clockwise pivotal movement of the lever into rotatory movement of the at least one shaft 510.

In some embodiments, the gear mechanism may include a clockwise one-way bearing configured to convert a clockwise pivotal movement of a lever of the pair of levers 506 into a first rotatory movement of the shaft 510. Additionally, the gear mechanism may include an anti-clockwise one-way bearing configured to convert an anti-clockwise pivotal movement of the lever of the pair of levers 506 into a second rotatory movement of the shaft 510. Further, each of the first rotatory movement and the second rotatory movement may be in the same direction.

In some embodiments, the gear mechanism may include at least one one-way bearing. Further, in some embodiments, the gear mechanism may include a planetary gear.

In some embodiments, the system 500 may include an electric generator 516, exemplarily illustrated as 516a-d, coupled to the at least one shaft 510. Further, the electric generator 516 may be configured for converting rotatory movement of the at least one shaft 510 into electrical energy.

Turning now to FIG. 6A-6C, the wave energy harvesting unit 302 according to an exemplary embodiment is illustrated. As illustrated, the pair of levers 306a and 306b is pivotally mounted on the shaft 308. Further, each of lever 306a and lever 306b are attached to first ends of return springs 602a and 602b at a first end. The second ends of springs 602a and 602b are attached to a support lever 604 of the wave energy harvesting unit 302. FIG. 6A illustrates a schematic side view of the wave energy harvesting system 302 for ocean waves when the springs 602a and 602b are in equilibrium position in the absence of any substantial movement of the wave energy harvesting unit 302 in relation to the stationary body, such as the ocean bed notated as point X. Further, as the buoyant platform 102 moves, for example due to a surface water wave, there is a resultant linear displacement of the wave energy harvesting unit 302 in relation to the stationary body, such as the ocean bed. However, since the pair of levers 306a and 306b are pivotally attached to the shaft 308 and tethered to the stationary body, the levers 306a and 306b begin to rotate due to displacement of the wave energy harvesting unit 302. Further, the lever 306a may rotate in an anti-clockwise direction while the lever 306b may rotate in a clockwise direction. FIG. 6B illustrates a schematic side view of the wave energy harvesting system 302 at one such moment during displacement of the wave energy harvesting unit 302 due to, for example, surface water waves. Similarly, FIG. 6B illustrates a schematic side view of the wave energy harvesting system 302 at a moment when a maximum displacement has been executed by the wave energy harvesting system 302. The pivotal movement of the levers 306a and 306b may be converted into a rotational motion of the shaft 308 as explained in conjunction with FIG. 3. Further, subsequent to attaining the maximum displacement, the buoyant platform 102 including the wave energy harvesting unit 302 may move in the opposite direction as the energy stored in the springs 604a and 604b are released. As a result, the levers 306a and 306b may return to the equilibrium position as shown in FIG. 6A. During this phase, the shaft 308 may continue to rotate in the same direction as before due to the use of the one-way locking mechanism. Consequently, displacement of the buoyant platform 102 due to, for example, surface water waves, may be converted to rotatory movement of the shaft 308 that may be further converted to electrical energy as explained earlier.

Turning now to FIG. 7, an energy harvesting system 700 for ocean waves according to some embodiments is illustrated. The energy harvesting system 700 may include a buoyant platform 702. The buoyant platform 702 may be configured to float above the ocean bed. In some embodiments, the buoyant platform 702 may be configured to float above the ocean bed and above the water surface. In some other embodiments, the buoyant platform 702 may be configured to float above the ocean bed but below the water surface. Further, the buoyant platform 702 may be configured to move around due to waves. For example, the buoyant structure may be a marine buoy.

In some embodiments, the buoyant platform 702 may include a buoyant structure configured to keep said buoyant platform 702 above the ocean bed. For instance, in some embodiments, the buoyant structure may include inflatable bladders made of heavy duty and flexible air or gas retaining material such as a heavy duty polymeric/rubberized or composite composition. Further, the inflatable bladders may be expanded by a pressurized gas charge and may be sufficiently puncture resistant to maintain inflation in a dynamic environment.

Figure 10:
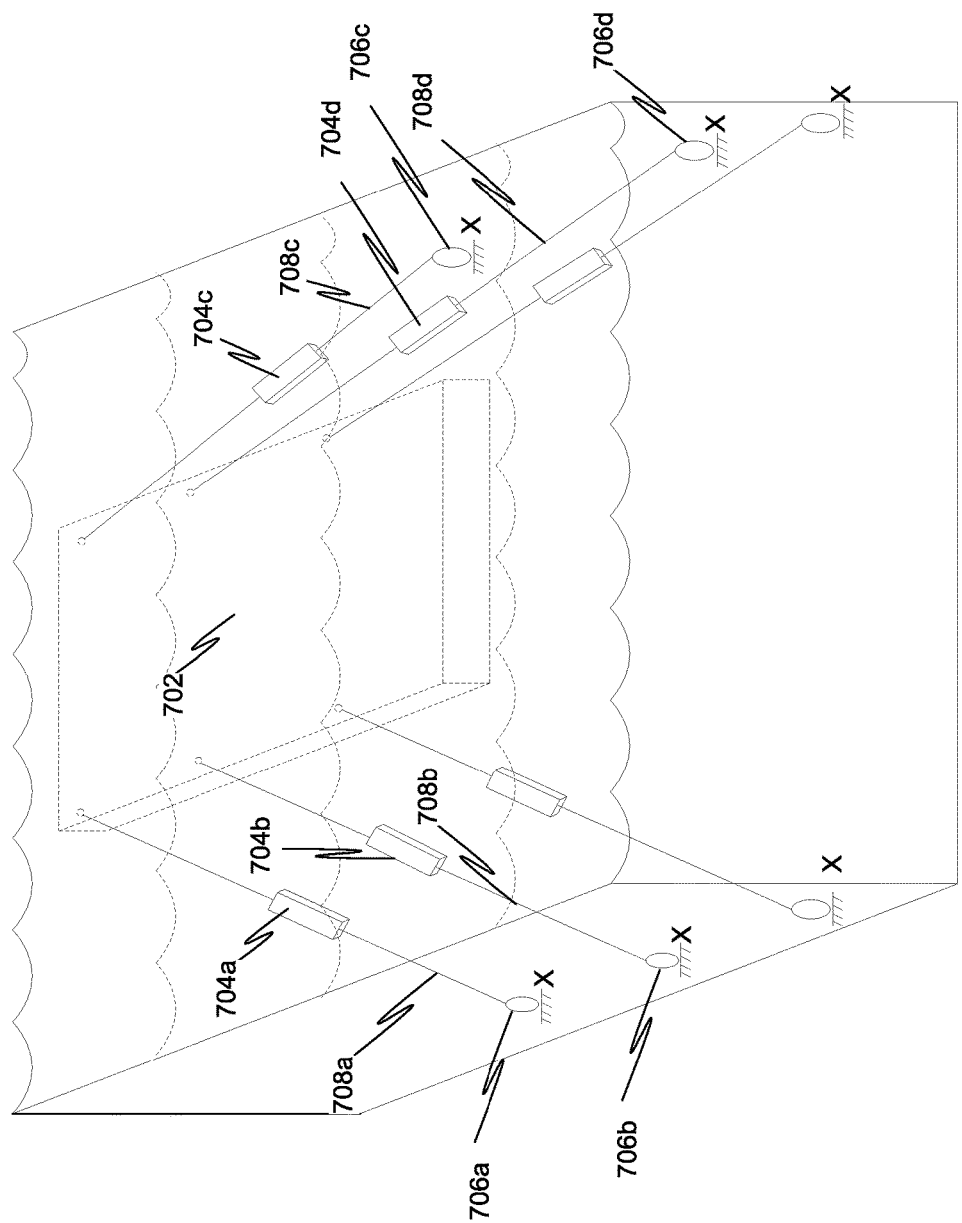

Furthermore, in some embodiments, the buoyant platform 702 may be configured to be submerged under the surface of a water body as exemplarily illustrated in FIG. 10. Accordingly, the buoyant platform 702 may be configured to at least partially sink into the water body. For instance, the buoyant platform 702 may include inflatable bladders within a controllable air supply. Further, the buoyant platform 702 may be configured to sink into the water body in the absence of sufficient air within the inflatable bladders. However, by maintaining a predetermined amount of air within the inflatable bladders, the buoyant platform may float in the upper region of the water body, while being submerged.

Further, the energy harvesting system 700 may include a plurality of wave energy harvesting units 704, exemplarily illustrated as 704a, 704b, 704c, and 704d in FIG. 7. Further, two or more of the plurality of wave energy harvesting units 704 may be tethered between the buoyant platform 702 and the ocean bed, illustrated as point 'X' through anchors 706, exemplarily illustrated as anchors 706a-706d. For instance, each of the plurality of wave energy harvesting units 704 may be tethered to the ocean bed using cables 708 such as, cable 708a to 708d. For example, the wave energy harvesting unit 704a may be tethered to the ocean bed using cable 708a as illustrated.

Additionally, a wave energy harvesting unit 704 may be actuated by motion of the buoyant platform 702. Accordingly, the wave energy harvesting unit 704 may absorb energy from the movement of the buoyant platform 702 resulted from the ocean waves. Further, the wave energy harvesting unit 704 may harvest kinetic energy absorbed from waves and convert into another form of energy.

Figure 8:
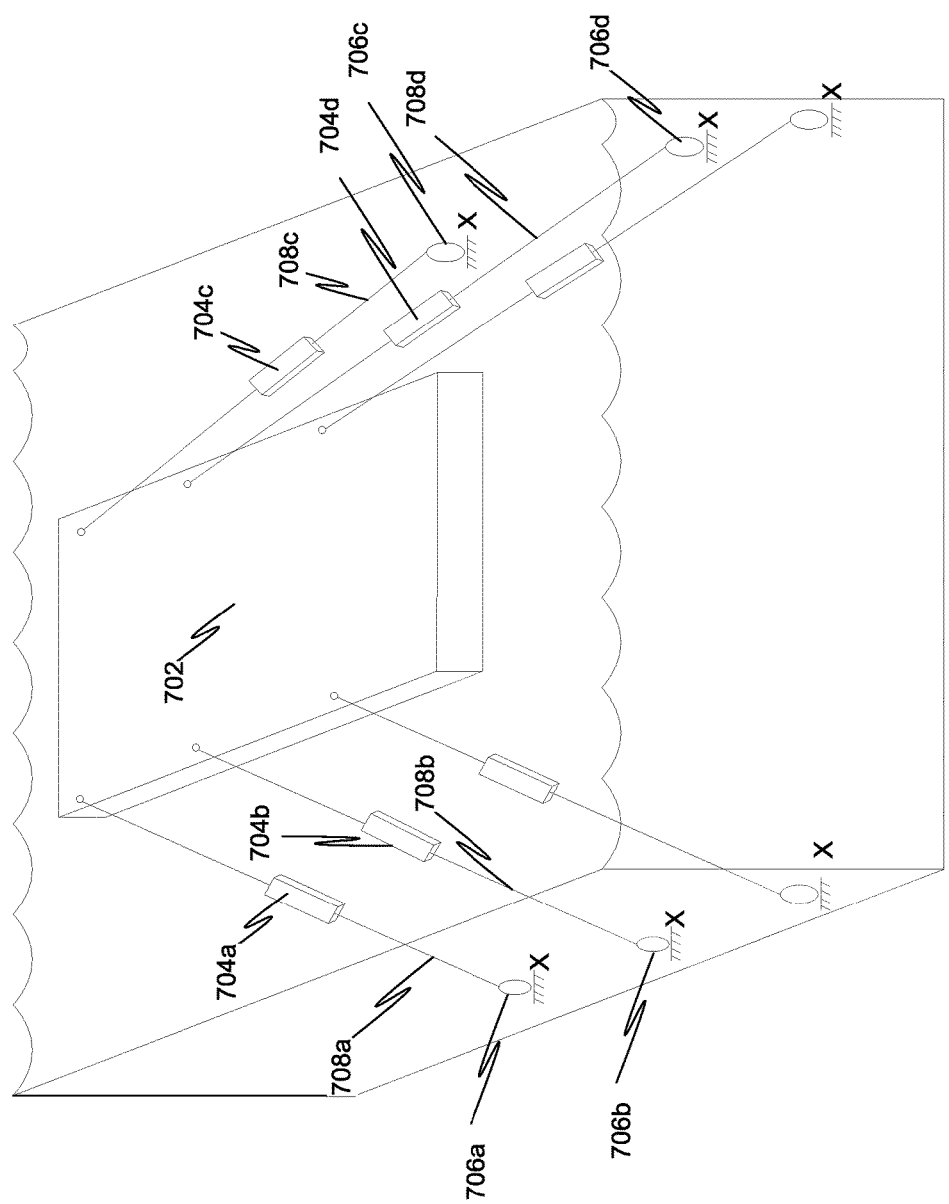
Figure 9:
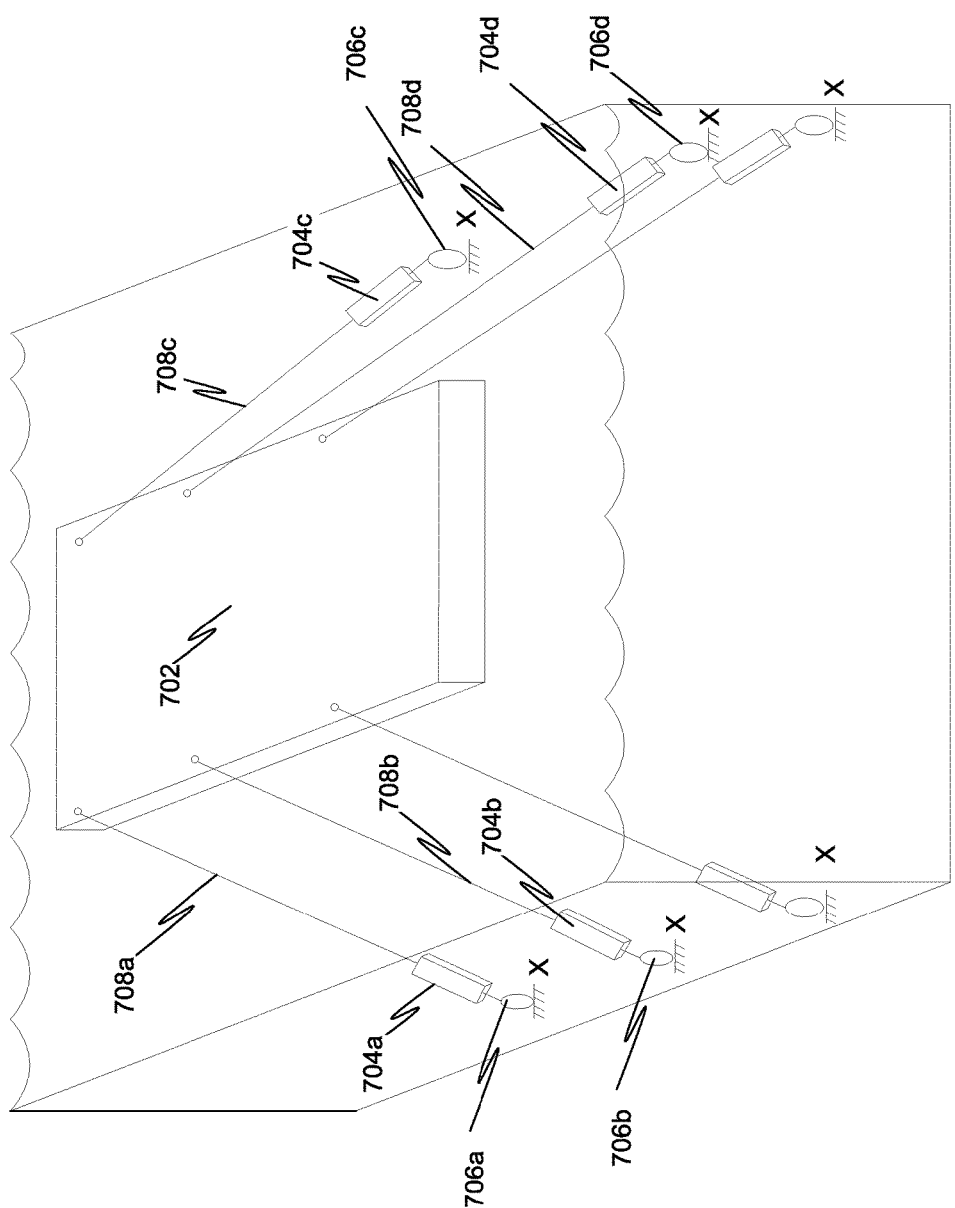

Further, in some embodiments, the wave energy harvesting unit 704 may be mounted on said buoyant platform 702 as exemplarily illustrated in FIG. 7. Furthermore, the wave energy harvesting unit 704 may be tethered to the ocean bed. As a result, the wave energy harvesting unit may be actuated by motion of the buoyant platform 702 against the ocean bed in order to harvest energy. In some embodiments, the wave energy harvesting unit 704 may be tethered between the buoyant platform 702 and the ocean bed as illustrated in FIG. 8. As a result, the wave energy harvesting unit 704 may be actuated by motion of the buoyant platform 702. Further, in some embodiments, the wave energy harvesting unit 704 may be secured at the ocean bed as illustrated in FIG. 9. Additionally, the buoyant platform 702 may be tethered to the wave energy harvesting unit 704 at the ocean bed. Accordingly, the wave energy harvesting unit 704 may be actuated by motion of the buoyant platform 702.

In some embodiments, the wave energy harvesting unit 704 may be a linear generator 1100 configured to generate electricity from movement of the buoyant platform 702 as illustrated exemplarily in FIG. 11. Linear generator 1100 may include a cylindrical enclosure 1102 configured to house a stator 1104. In some embodiments, the stator may include one or more of a magnet and a coil. Further, the stator may be configured to remain stationary in relation to the cylindrical enclosure 1102. Additionally, a shape of the stator 1104 may be such that an inner space is formed within the cylindrical enclosure. Further, the linear generator 1100 may include a piston 1106 configured to move within the inner space. The piston 1106 may include one or more of a magnet and a coil. Furthermore, the piston 1106 may include a rod attached to a mounting point 1108a. The mounting part 1108a may be configured to be fastened to one end of the cable 708. Likewise, the cylindrical enclosure 1102 may also include a mounting point 1108b configured to be fastened to the cable 708, in some embodiments. However, in other embodiments, the mounting point 1108b may be configured to be fastened to the buoyant platform 702.

Figure 12:
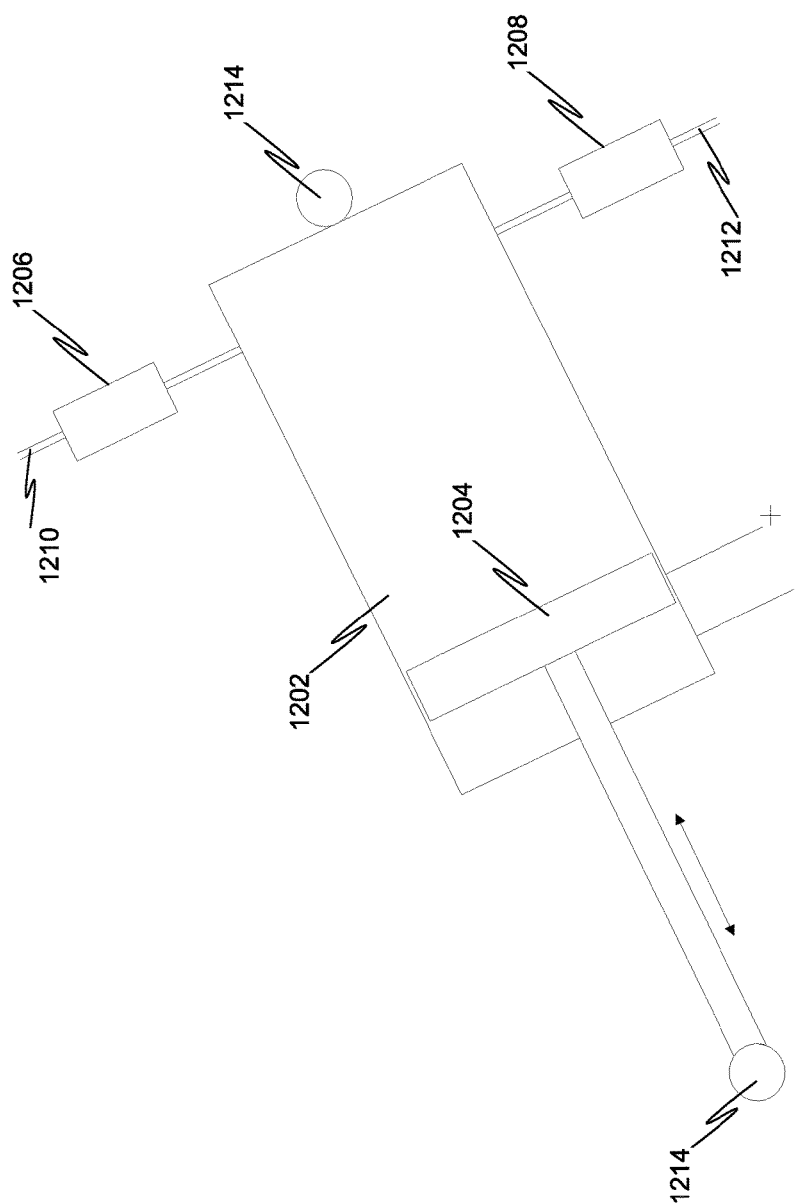
FIG. 12 illustrates a cross-sectional view of a hydraulic cylinder included in the energy harvesting system for ocean waves in accordance with various embodiments.

In some other embodiments, the wave energy harvesting unit 704 may be a hydraulic cylinder 1200 configured to harvest energy by pressurizes fluid from movement of the buoyant platform 702. For instance, as illustrated in FIG. 12, the hydraulic 1200 may include a cylindrical enclosure 1202 configured to house a piston 1204. Further, the piston 1204 may be configured to move within an inner space formed within the cylindrical enclosure 1202. Further, the hydraulic cylinder 1200 may include each of an input check valve 1206 and an output check valve 1208 configured to control flow of a pneumatic fluid, such as oil, into the inner space of the cylindrical enclosure 1202. The input check valve 1206 may be configured to allow a unidirectional flow of pneumatic fluid from an input hose 1210 into the inner space of the cylindrical enclosure 1202. Further, the output check valve 1208 may be configured to allow a unidirectional flow of pneumatic fluid from the inner space of the cylindrical enclosure 1202 to an output hose 1212. Additionally, the hydraulic cylinder 1200 may include mounting points 1214 configured to be fastened to one or more of a cable 708 and the buoyant platform 102. As a result, back and forth motion of piston 1204 may cause a unidirectional flow of the pneumatic fluid which may then be used to perform work.

Although the invention has been explained in relation to its preferred embodiment, it is to be understood that many other possible modifications and variations can be made without departing from the spirit and scope of the invention as hereinafter claimed.

The following is claimed:

1. An energy harvesting system for ocean waves comprising:
   a buoyant platform, wherein said buoyant platform floats above the ocean bed; and
   a plurality of wave energy harvesting units, wherein at least two of said plurality of wave energy harvesting units are tethered between said buoyant platform and the ocean bed, wherein a wave energy harvesting unit of said plurality of wave energy harvesting units is actuated by motion of said buoyant platform, wherein said wave energy harvesting unit absorbs energy from the buoyant platform's movement resulted from the ocean waves;

said energy harvesting unit for ocean waves further comprises two levers mounted on a same shaft, wherein a first lever of said two levers is operationally connected to an input shaft with a one-way locking mechanism in-between, wherein a second lever of said two levers is operationally connected to said input shaft with a one-way locking mechanism in-between, wherein said first lever is configured to spin said input shaft while said first lever is being actuated and said second lever is configured to spin said the input shaft while the second lever is being released.

2. The energy harvesting system for ocean waves of claim 1, wherein said buoyant platform comprises at least one rail and at least one buoyant structure, wherein said rail is attached to said at least one buoyant structure, wherein said buoyant structure helps keep said buoyant platform afloat above from ocean bed.

3. The energy harvesting system for ocean waves of claim 2, wherein said buoyant platform comprises a plurality of rails of different shapes and a plurality of buoyant structures, wherein said plurality of rails are spaced apart from one another to form said buoyant platform with spaces between said plurality of rails.

4. The energy harvesting system for ocean waves of claim 2, wherein said buoyant structure is a marine buoy.

5. The energy harvesting system for ocean waves of claim 1, wherein said buoyant platform comprises a buoyant structure, wherein said buoyant structure keeps said buoyant platform above the ocean bed.

6. The energy harvesting system for ocean waves of claim 1, wherein said buoyant platform is configured to float above the ocean bed and above the water surface.

7. The energy harvesting system for ocean waves of claim 1, wherein said buoyant platform is configured to float above the ocean bed but below the water surface, wherein said buoyant platform is configured to move around due to waves.

8. The energy harvesting system for ocean waves of claim 1, wherein said buoyant platform is placed free floating above the ocean bed, wherein force applied to said buoyant platform by the waves is leveraged against the ocean bed in order to harvest energy.

9. The energy harvesting system for ocean waves of claim 1, wherein said buoyant platform further comprises at least one wave-catcher, wherein said at least one wave-catcher is connected to said buoyant platform, wherein said at least one wave-catcher is configured to move said buoyant platform further by restricting moving waves, wherein said at least one wave-catcher pushes said buoyant platform and transfers all energy harvested by said wave-catcher from intercepting waves.

10. The energy harvesting system for ocean waves of claim 9, wherein the at least one first wave-catcher and is configured to intercept travelling waves.

11. The energy harvesting system for ocean waves of claim 1, wherein said wave energy harvesting unit is mounted on said buoyant platform, wherein said wave energy harvesting unit is tethered to the ocean bed, wherein said wave energy harvesting unit is actuated by motion of said buoyant platform against the ocean bed in order to harvest energy.

12. The energy harvesting system for ocean waves of claim 1, wherein said wave energy harvesting unit is tethered between said buoyant platform and the ocean bed, wherein said wave energy harvesting unit is actuated by motion of said buoyant platform.

13. The energy harvesting system for ocean waves of claim 1, wherein said wave energy harvesting unit is secured at the ocean bed, wherein said buoyant platform is tethered to said wave energy harvesting unit at the ocean bed, wherein said wave energy harvesting unit is actuated by motion of said buoyant platform.

14. The energy harvesting system for ocean waves of claim 1, wherein said wave energy harvesting unit further comprises a return spring for said second lever, wherein the return spring is a torsion bar.

15. The energy harvesting system for ocean waves of claim 1, wherein said one-way locking mechanism is a one-way bearing operationally connected between said two levers and the input shaft.

16. The energy harvesting system for ocean waves of claim 1, wherein said wave energy harvesting unit harvests kinetic energy absorbed from waves and converts into another form of energy.

17. An energy harvesting system for ocean waves comprising:
 a buoyant platform;
  said platform being buoyant above ocean bed but below water surface;
 a plurality of wave energy harvesting units;
  each of said plurality of wave energy harvesting units comprises an energy harvesting mechanism, a return mechanism, a buoyant platform, and a cable;
 said each of plurality wave energy harvesting units is tethered in-between said buoyant platform and the ocean bed with help of said cable, wherein the wave energy harvesting unit is actuated by motion of said buoyant platform, wherein said wave energy harvesting unit absorbs energy from the buoyant platform's movement resulted from the ocean waves;
 said return mechanism being operatively connected to the wave energy harvesting unit, wherein said return mechanism recoils the wave energy harvesting system after every actuation.

18. The energy harvesting system for ocean waves of claim 17, wherein said buoyant platform comprises at least one rail and at least one buoyant structure, wherein said rail is attached to said at least one buoyant structure, wherein said buoyant structure helps keep said buoyant platform afloat above from ocean bed.

19. The energy harvesting system for ocean waves of claim 18, wherein said buoyant platform comprises a plurality of rails of different shapes and a plurality of buoyant structures, wherein said plurality of rails are spaced apart from one another to form said buoyant platform with spaces between said plurality of rails.

20. The energy harvesting system for ocean waves of claim 18, wherein said buoyant structure is a marine buoy.

21. The energy harvesting system for ocean waves of claim 17, wherein said buoyant platform comprises a buoyant structure, wherein said buoyant structure keeps said buoyant platform above the ocean bed.

22. The energy harvesting system for ocean waves of claim 17, wherein said buoyant platform is configured to float above the ocean bed but below the water surface, wherein said buoyant platform is configured to move around due to waves.

23. The energy harvesting system for ocean waves of claim 17, wherein said buoyant platform is placed free floating above the ocean bed, wherein force applied to said buoyant platform by the waves is leveraged against the ocean bed in order to harvest energy.

24. The energy harvesting system for ocean waves of claim 17, wherein said buoyant platform further comprises at least one wave-catcher, wherein said at least one wave-catcher is connected to said buoyant platform, wherein said at least one wave-catcher is configured to move said buoyant platform further by restricting moving waves, wherein said at least one wave-catcher pushes said buoyant platform and transfers all energy harvested by said wave-catcher from intercepting waves.

25. The energy harvesting system for ocean waves of claim 24, wherein the at least one first wave-catcher is configured to intercept travelling waves.

26. The energy harvesting system for ocean waves of claim 17, wherein said wave energy harvesting unit is mounted on said buoyant platform, wherein said wave energy harvesting unit is tethered to the ocean bed, wherein said wave energy harvesting unit is actuated by motion of said buoyant platform against the ocean bed in order to harvest energy.

27. The energy harvesting system for ocean waves of claim 17, wherein said wave energy harvesting unit is tethered between said buoyant platform and the ocean bed, wherein said wave energy harvesting unit is actuated by motion of said buoyant platform.

28. The energy harvesting system for ocean waves of claim 17, wherein said wave energy harvesting unit is secured at the ocean bed, wherein said buoyant platform is tethered to said wave energy harvesting unit at the ocean bed, wherein said wave energy harvesting unit is actuated by motion of said buoyant platform.

29. The energy harvesting system for ocean waves of claim 17, wherein said wave energy harvesting unit is a linear generator, wherein said linear generator is configured to generate electricity from movement of said buoyant platform.

30. The energy harvesting system for ocean waves of claim 17, wherein said wave energy harvesting unit is a hydraulic cylinder, wherein said hydraulic cylinder harvests energy by pressurizes fluid from movement of said buoyant platform.

31. The energy harvesting system for ocean waves of claim 17, wherein said wave energy harvesting unit harvests kinetic energy absorbed from waves and converts into another form of energy.

* * * * *